Jan. 8, 1924.   1,479,915

G. E. HULSE

CONNECTING DEVICE FOR BELTS

Filed July 14, 1922

Inventor
George E. Hulse
Attorney

Patented Jan. 8, 1924.

1,479,915

UNITED STATES PATENT OFFICE.

GEORGE E. HULSE, OF NEW HAVEN, CONNECTICUT, ASSIGNOR TO SAFETY CAR HEATING & LIGHTING COMPANY, A CORPORATION OF NEW JERSEY.

CONNECTING DEVICE FOR BELTS.

Application filed July 14, 1922. Serial No. 574,923.

*To all whom it may concern:*

Be it known that I, GEORGE E. HULSE, a citizen of the United States, and a resident of New Haven, in the county of New Haven and State of Connecticut, have invented an Improvement in Connecting Devices for Belts, of which the following is a specification.

This invention relates to devices for fastening or connecting together the ends of belts and the like.

An object of this invention is to provide a simple and practical construction of the above nature of reliable action and simplicity of application to the belt ends. Another object is to provide a connecting device for belts of inexpensive construction yet durable and lasting when in use and capable of repeated application in a simple and inexpensive manner. Other objects will be in part obvious or in part pointed out hereinafter.

The invention accordingly consists in the features of construction, combinations of elements and arrangements of parts as will be exemplified in the structure to be hereinafter described and the scope of the application of which will be indicated in the following claims.

In the accompanying drawings in which is shown one of various possible embodiments of this invention, Figure 1 is a perspective view showing the connecting device in assembled relation with respect to a belt.

Figure 1:
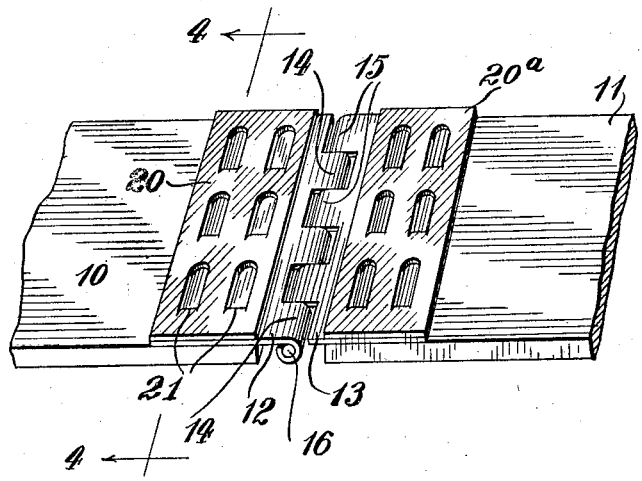

Turning now to the drawings and more particularly to Fig. 1, there are shown the belt ends 10 and 11 which it is desired to connect together. I provide a pair of plate members 12 and 13 provided with a plurality of preferably integrally formed and downwardly bent loop portions 14 and 15 respectively, alternately arranged with respect to one another and spaced to permit the loop portions 14 of the plate 12 to be aligned with the loop portions 15 of the plate member 13. The substantially cylindrical openings formed in the loop portions 14 and 15 may thus be readily aligned thereby to permit the insertion through the registered loop portions 14 and 15 of the rod 16, whereby the plate members 12 and 13 are flexibly connected together.

At this point it might be noted that the plate members 12 and 13 and the rod 16 are preferably made of a metal having good wearing qualities, such as, for example, plate steel; and I may, if desirable or required by certain conditions of use, harden these parts in any suitable manner in order further to better the wearing qualities of the respective parts. It will be seen that in actual use, and particularly where the belt is adapted for operation in connection with pulleys of relatively small diameter, considerable wear may take place due to the relative movement in the flexible connection between the plates 12 and 13. It is therefore highly desirable, as above mentioned, that these coacting parts be made of a material, or be hardened, to adapt these parts to resist excessive wear.

Figure 3:
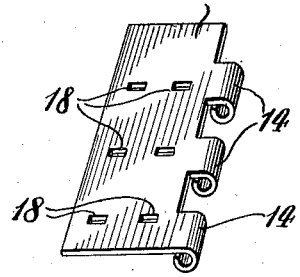
Figure 3 is a like perspective view of another part of the belt-connecting device with which the part shown in Fig. 2 is adapted to cooperate.

Referring now to Fig. 3 of the drawings, there is shown in perspective the plate member 12, and it will be noted that I have provided in the plate member 12 a plurality of openings or apertures 18 preferably regularly spaced transversely of the plate member 12 and desirably substantially uniformly distributed throughout the area of the plate member 12. Preferably I make these openings 18 of substantially rectangular shape, the openings being made so that the greater dimension thereof extends in the direction of the line of pull of the belt. In this connection it might be noted that the plate member 13 coacting with the plate member 12 as hereinbefore described is similarly provided with a plurality of openings, but in order to simplify the drawings these details of the plate 13 are not illustrated.

Figure 2:
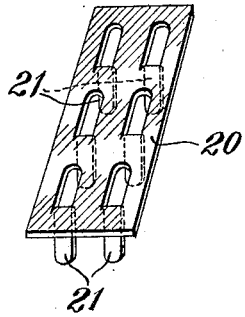
Figure 2 is a perspective view of one of the parts before application.

The plate member 12, as will be seen in Fig. 1 of the drawings, is adapted to overlap the belt end 10, preferably upon that side of the plate 12 toward which the loop members 14 are bent. The plate member 13 in substantially similar manner overlaps the belt end 11. Considering now the perspective view in Fig. 2, there is shown a strip 20 of a general plate-like form preferably formed of a metal relatively soft as compared to that of the plate members 12 and 13 hereinbefore described. The member 20 has integrally formed therewith a plurality of belt-engaging devices or studs 21 extending normally to the plane of the member 20 and, as seen in Fig. 2, the studs or belt-engaging devices 21 are in depending relation with respect to the member 20. The member 20 is of such dimension as to substantially register with and cover the plane portion of the plate member 12, and the plurality of belt-engaging devices 21 are so disposed throughout the member 20 as to coincide substantially with the disposition of the plurality of openings 18 in the plate member 12, for example. Also, the devices or studs 21 are shaped as to their cross section to fit snugly into the openings 18 in the plate member 12. I may conveniently stamp the studs 21 out of the plate-like member 20, and in Fig. 2 of the drawings they are so shown.

Figure 4:
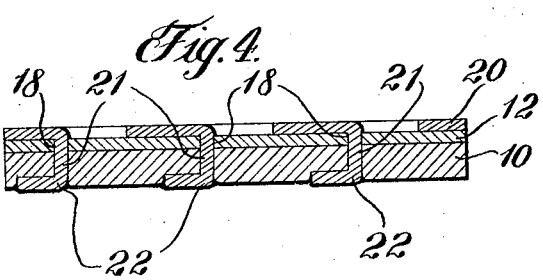
Figure 4 is a vertical section taken on the line 4—4 of Fig. 1.

Considering now the relations of the several parts above described and referring more particularly to Fig. 4, it will be seen that the belt-engaging devices or studs 21 are passed through the openings 18 in the plate member 12 and through the belt end 10 whereupon the protruding ends may be suitably operated upon to clamp the several parts together. Thus, as is clearly shown in Fig. 4, the devices 21 are bent over as at 22, being preferably somewhat embedded in the belt material to present a smooth contacting surface. The belt end 10 is thus securely clamped to the plate member 12 and it will be seen that by the substantially uniform distribution of the plurality of belt-clamping devices 21 throughout the area of the plate member 12 a large surface of frictional engagement between the belt proper and the plate member 12 is obtained and that the connection is thus of great security. Moreover, the studs 21 being as before noted of preferably rectangular cross section and registering with the openings 18 which, as also above noted, are positioned so that the greater dimensions is in the direction of the line of pull of the belt, the belt-engaging members 21 may effectively resist any tendency to bend by reason of the stresses imposed upon them by the pull of the belt.

A substantially similar strip as 20ª in Fig. 1 with associated belt-engaging devices is associated in substantially similar manner with the other plate member 13, as will be readily understood from Fig. 1 of the drawings.

The strip or member 20 with associated studs 21 is, as above noted, preferably made of a metal relatively soft as compared to the metal of the plate members 12 and 13 and may, for example, be made of a metal or alloy thereof, such as copper or bronze for example, in order to facilitate the ready and convenient heading over of the studs 21.

It will thus be seen that there has been provided in this invention a device in which the several objects hereinbefore set forth, as well as many advantages, are attained. It may be noted that the belt-connecting device is readily applied and that where readjustment of the belt length is necessary a new strip 20 with associated studs 21 may be readily employed without necessitating the provision of an entire new connecting device. The plate members 12 and 13 may be made of materials best suited to withstand the wear and strain to which they are subjected in normal use, whereas the member 20 with associated parts may be selected of a metal best adapted for ready and convenient application as hereinbefore set forth.

Moreover, the disadvantages resulting from making the belt-engaging devices 21 integral with a plate member, such as 12, and making the connecting device incapable of repeated use are successfully avoided and many other advantages achieved.

As many possible embodiments may be made of the above invention and as many changes might be made in the embodiment herein set forth, it is to be understood that all matter hereinbefore set forth or shown in the accompanying drawings is to be interpreted as illustrative and not in a limiting sense.

I claim as my invention:

1. In a device of the general nature of that herein described, in combination, a connecting member having a belt end secured thereto at one end thereof and having a plurality of openings in substantially the other end thereof, and means for securing another belt end to said connecting member including a plurality of belt-engaging members integrally connected with one another and separate from said connecting unit and each passing through one of said openings to engage said belt end.

2. In a device of the general nature of that herein described, in combination, a connecting member having one end of a belt secured thereto at one end thereof and having a plurality of openings in substantially the other end thereof, and means including a plate member separate from said connecting member having a plurality a belt-engaging members integrally formed therewith and each adapted to substantially register with and to pass through one of said openings for securing the other end of said belt to said connecting member.

3. In a device of the general nature of that herein described, in combination, a plate member having one end of a belt secured thereto and at substantially one end thereof and having a plurality of openings in substantially the other end thereof, and a second plate independent of said first plate member having a plurality of integrally formed depending belt-engaging members adapted to be superimposed upon said first plate member, each of said belt-engaging members being adapted to substantially register with and to pass through one of said openings in said first plate member thereby to engage and secure the other end of said belt to said first plate member.

4. In a device of the general nature of that herein described, in combination, a pair of plate members, one of said plate members having one end of a belt secured thereto and the other having a plurality of openings therein, means forming a flexible connection between said pair of plate members, and means for securing the other end of said belt to said other plate member including a strip removably superimposed thereon and having a plurality of depending belt-engaging devices each of which is adapted to pass through one of said openings in said other plate member for engagement with said other end of said belt.

5. In a device of the general nature of that herein described, in combination, a pair of plate members, one of said plate members having a belt end secured thereto and the other having a plurality of openings therein, means forming a flexible connection between said plate members, and means for securing another belt end to said other plate member including a strip of relatively soft metal having a plurality of integrally formed studs each adapted to pass through one of said openings and through said other belt end and to be headed over thereby to clamp said other plate member between said strip and said belt end.

6. In a device of the general nature of that herein described, in combination, a connecting member of plate-like form having a plurality of openings therein, means having a belt end secured thereto and forming a flexible connection between said belt end and said connecting member, and means for securing another belt end to said connecting member including a plurality of clamping devices of relatively soft metal integrally connected at one end and each adapted to pass through one of said openings in said connecting member to clamp said belt end thereto.

In testimony whereof, I have signed my name to this specification this 6th day of July, 1922.

GEORGE E. HULSE.